Dec. 27, 1938.    C. V. BERGSTROM    2,141,159

LENS

Original Filed July 10, 1933

INVENTOR.
CARL V. BERGSTROM
BY Louis O. French
ATTORNEY.

Patented Dec. 27, 1938

2,141,159

UNITED STATES PATENT OFFICE 2,141,159

LENS

Carl V. Bergstrom, Milwaukee, Wis., assignor to Corning Glass Works, Corning, N. Y., a corporation of New York Application July 10, 1933, Serial No. 679,599
Renewed August 24, 1935

3 Claims. (Cl. 88—82)

The invention relates to lenses and more particularly to lenses used in traffic danger signals.

One of the objects of the invention is to provide a signal lens which may be illuminated by reflection or by direct illumination and when directly illuminated will still maintain a substantially full field of illumination.

A further object of the invention is to provide a lens whose reflecting area may be of a different color than that of the lens itself.

A further object is to provide an improved form of button type reflector lens.

The invention further consists in the several features hereinafter set forth and more particularly defined by claims at the conclusion hereof.

Figure 1:
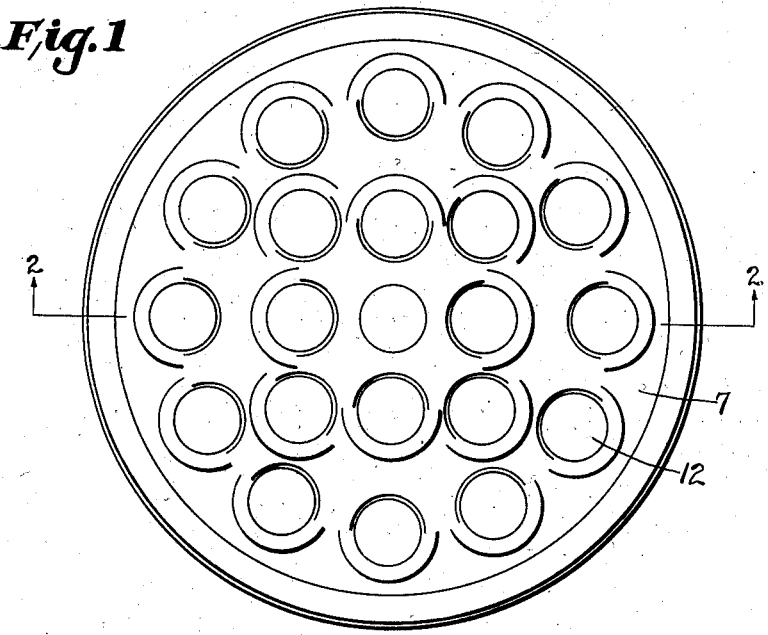
Fig. 1 is a plan view of a lens embodying the invention.
Figure 2:
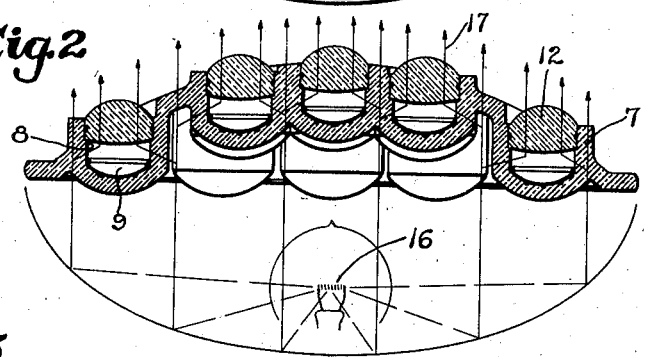
Fig. 2 is a detail vertical sectional view taken on the line 2—2 of Fig. 1.
Figure 5:
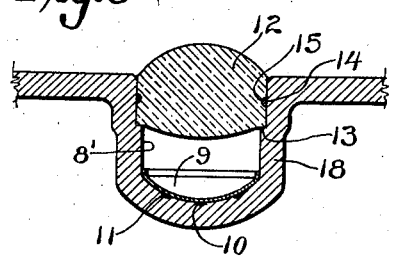
Fig. 5 is a detail vertical sectional view similar to Fig. 3 showing certain modifications.
Figure 3:
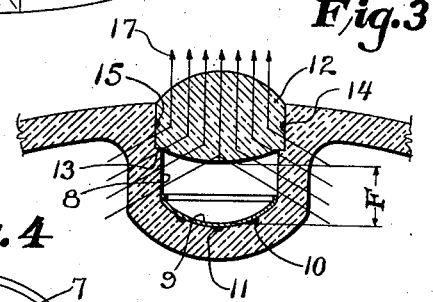
Fig. 3 is an enlarged detail vertical sectional view of a portion of the lens.

Referring to Figs. 1 to 3 inclusive, the numeral 7 designates a lens formed of glass or other suitable material. This lens is provided with a plurality of pockets 8 which are preferably formed integral with the lens which may be conveniently made as a moulded structure. The bottom of the pockets 8 form sockets for reflectors 9 which have tight push fits in said sockets against backings 10 of permanent cement, the bottoms of the pockets having grooves 11 therein to facilitate holding the cement. Each reflector is preferably a conically curved sheet metal stamping, either silver or chromium plated.

Figure 4:
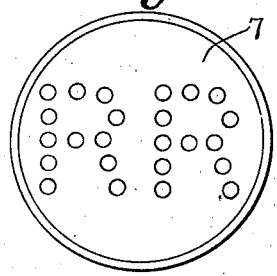
Fig. 4 is a plan view showing certain modifications.

A so-called button lens 12 has a close fit in the top portion of the pocket 8 and as herein shown rests against a shoulder 13 formed in the main lens body and is permanently secured in place by cement 14 disposed in a groove 15 in said lens. The cement should be of the best heat and waterproof character obtainable and transparent if possible. The light from the headlight beams of an automobile are reflected by the reflectors 9 back through the lenses 12 and intensified by the action of these lenses in the usual manner, the distance F representing the focal distance which may be varied to vary the intensity and angular range of the reflecting button. The greater the distance F the more intense the reflection, but also the narrower the range of the reflecting button. The buttons according to known practice may be arranged in the form of letters or indicating symbols of various kinds. For example I have shown in Fig. 4 a lens provided with buttons arranged to form the letters "R. R." to be used as a warning for a railroad crossing.

When the full diameter illumination of the lens is desired the light rays from a lamp source, such as 16, find their way through the whole lens in spite of the opaque inserted reflectors since the light may pass through the sides of the reflector pockets and then through the button lenses as shown by the arrows 17 in Fig. 3. If now for any reason the light source should be out, the lens immediately becomes a reflecting signal.

To provide a lens with a two color effect, the button lenses 12 may be of a different color than that of the lens itself. For example the lens itself may be green and the button lenses red.

When the full illumination is not desired, the button lenses 12 and the reflectors 9 may be used in pockets 8', similar to the pockets 8, and formed in a support 18 of stamped or cast metal or other suitable material. When the button lenses are used with a lens body as a support, if the illumination of the signal is not too bright, the light beams of car headlights will, upon contacting the reflecting part of the lens build up the intensity of the signal considerably. This makes it possible to use lamps of lower wattage than usually employed in traffic danger and obstruction signals and it will also provide a signal having a flashing effect to the driver's vision.

The invention is not to be limited to any particular form or arrangement of parts except in so far as such limitations are included in the claims.

By the phrase "a light source . . . in optical relation with the lens" as used in certain of the claims herein, I mean that relation of a light source and a lens which results in light from the source falling on a face of the lens in such a direction as to be refracted thereby and to pass through the opposite face of the lens.

What I claim as my invention is:

1. In a device of the character described, the combination of a lamp lens provided with a plurality of integral pockets, reflectors mounted in said pockets, and a lens associated with each reflector and in light conductive relation with said lamp lens.

2. In a device of the character described, the combination of a lamp lens provided with a plurality of integral sockets, button lenses mounted in said sockets and in light conductive relation therewith, and opaque reflectors cooperating with said button lenses and mounted on the bases of said sockets.

3. In a device of the character described, the combination of a base lamp lens provided with a plurality of integral transparent pockets, a reflector mounted at the base of each pocket, a lens associated with each reflector, said base lens having light conductivity through the entire lens structure.

CARL V. BERGSTROM.